(12) United States Patent
Chang et al.

(10) Patent No.: US 7,503,674 B2
(45) Date of Patent: Mar. 17, 2009

(54) HIGH-BRIGHTNESS DIFFUSION PLATE WITH TRAPEZOID LENS

(75) Inventors: Greta Chang, Jhongli (TW); Jen-Huai Chang, Jhongli (TW); Jyh-Horng Wang, Jhongli (TW)

(73) Assignee: Entire Technology Co., Ltd., Taoyuan County (TW)

( * ) Notice: Subject to any disclaimer, the term of this patent is extended or adjusted under 35 U.S.C. 154(b) by 109 days.

(21) Appl. No.: 11/652,570

(22) Filed: Jan. 12, 2007

(65) Prior Publication Data

US 2007/0297168 A1   Dec. 27, 2007

(30) Foreign Application Priority Data

Jun. 27, 2006   (TW) ............... 95123211 A

(51) Int. Cl.
*F21V 5/02* (2006.01)
(52) U.S. Cl. ............ 362/240; 362/244; 362/223
(58) Field of Classification Search ........ 362/241, 362/240, 222, 223, 244
See application file for complete search history.

(56) References Cited

U.S. PATENT DOCUMENTS

| | | | |
|---|---|---|---|
| 6,086,212 A * | 7/2000 | Onishi et al. | 362/621 |
| 6,751,023 B2 * | 6/2004 | Umemoto et al. | 359/599 |
| 2005/0122591 A1 * | 6/2005 | Parker et al. | 359/619 |
| 2005/0270654 A1 * | 12/2005 | Goto et al. | 359/626 |

* cited by examiner

*Primary Examiner*—Laura Tso
(74) *Attorney, Agent, or Firm*—Rosenberg, Klein & Lee

(57) ABSTRACT

A high-brightness diffusion plate with trapezoid lens applied to a direct-type backlight module is disclosed. The high-brightness diffusion plate with trapezoid lens according to the present invention consists of a diffusion plate and a plurality of trapezoid lens disposed on at least one side of the diffusion plate for improving light efficiency and diffusion effect of the diffusion plate. By the diffusion plate with trapezoid lens, the direct-type backlight module provides better light output as well as more uniform brightness. Moreover, the diffusion plate of the present invention is used in combination with all or part of optical film. The optical film includes brightness enhancement film (BEF), an upper diffuser sheet and an lower diffuser sheet. The diffusion plate is made from plastic. By extrusion, the diffusion plate and the plurality of trapezoid lens are easily processed to form an integral. Therefore, the direct-type backlight module has better light output efficiency with lower cost.

16 Claims, 5 Drawing Sheets

HIGH-BRIGHTNESS DIFFUSION PLATE WITH TRAPEZOID LENS

BACKGROUND OF THE INVENTION

The present invention relates to a high-brightness diffusion plate applied to a direct-type backlight module whose surface is disposed with a plurality of trapezoid lens. By the trapezoid lens, the direct-type backlight module provides better output light with higher brightness and uniform diffusion.

During various kinds of flat panel displays, liquid crystal displays have received heightened research and development attention. Due to manufactures in Japan, Korea and Taiwan that are investing heavily in the research and development of this field and using more large-scale factory equipment for manufacturing, the quality of LCD display is improved with lower cost so that the needs for the display are increased. For satisfying more requirements of the LCD, the main trends of LCD include: (1) Increased area of glass substrate and continuous development among generations of LCD production from the seventh generation factory to the eighth, even the ninth generation factory. (2) New technology for color filter such as molding process that reduces the cost or the roller to roller process that breaks bottlenecks of manufacturing processes. (3) integration of the polarizing plate with the retardation film and the traditional casting process is replaced by an extrusion process. (4) New technology for light sources and optical films that makes external electrode fluorescent lamp and flat light source more feasible and practical and LED is used as main light source for backlight module. (5) Technology for integrating the diffusion film with the prism sheets. In the present invention, the diffusion plate is integrated with the prism sheets (brightness enhancement film).

The electric filed is necessary for liquid crystal displays to pull or align the liquid crystal molecules and the liquid crystal displays is illuminated from the back by a backlight module. Generally, backlight modules of liquid crystal displays are divided into two major categories according to numbers of lamps 10 and positions of light diffusion component 12: edge light type and direct-type. As shown in FIG. 1A, the edge light type backlight module can't provide high brightness and uniform light when being applied to large screen LCD displays due to number of the lamps 10 and light transmitting distance. Refer to FIG. 1B, the direct-type backlight module meets requirements of high intensity and uniform diffusion of light by increasing of the lamp 10 number and better design of diffusion component.

Refer to FIG. 2, a conventional direct-type backlight module consists of a reflector 20, a cold cathode fluorescent lamp (CCFL) 22 as a light source, a diffusion plate 24, a lower diffuser sheet 26, a prism sheet 28 and an upper diffuser sheet 30, from bottom to top sequentially. The backlight module connects with a liquid crystal display panel 32. Both the LCD screens and notebooks are edge lighting and only a personal user uses the device in short distance, the horizontal viewing angle is no longer important. Thus by light guide plate in combination with two mutually perpendicular prism sheets 28, light energy over 45 degrees is focused on a central point so as to enhance brightness. However, on LCD televisions, it's common to have a plurality of viewers at the same time so that the horizontal viewing angle matters. Generally during direct-type backlight module, a brightness enhancement film is formed by a diffusion plate together with the prism sheet 28 and the brightness enhancement film is used in combination with top and bottom diffusion films as a light diffusion element.

Take A direct-type backlight module for a 32" liquid crystal display television as an example, cost for key components is as following: prism sheet accounts for 38%, diffusion film for 5% and the diffusion plate for 10%. Thus the most expensive component is the backlight module is the prism sheet and the cost is dramatically reduced without the prism sheet.

Therefore, the present invention provides a diffusion plate with trapezoid microstructure that is applied to diffusion plates of direct type backlight modules for brightness enhancement and uniformness. Moreover, the prism sheet can be omitted for saving cost and the device is easy to be mass-produced.

SUMMARY OF THE INVENTION

Therefore it is a primary object of the present invention to provide a high-brightness diffusion plate applied to a direct-type backlight module. A plurality of trapezoid lens is disposed on surface of the diffusion plate so as to make the direct-type backlight module provide better light output with higher brightness and uniform diffusion. The diffusion plate is made from plastic, being pressed into a plate through an extrusion process. Simultaneously, a plurality of trapezoid lens is produced by a trapezoid mold on a roller of an extruder. A diffusion plate with trapezoid structure is extruded directly. In usage, the diffusion plate according to the present invention replaces conventional prism sheets. The diffusion plate with trapezoid structure is used in combination with the lower diffuser sheet so as to increase brightness and reduce cost. Moreover, the diffusion plate is added with diffusion particles to make the light output more uniform and reduce the number of the diffuser sheet being used. Thus the cost is reduced.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1A:
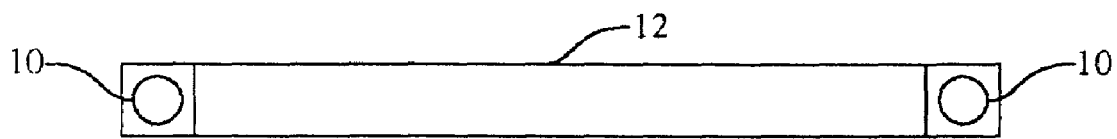
FIG. 1A is a schematic drawing of a conventional direct-type backlight module.
Figure 1B:
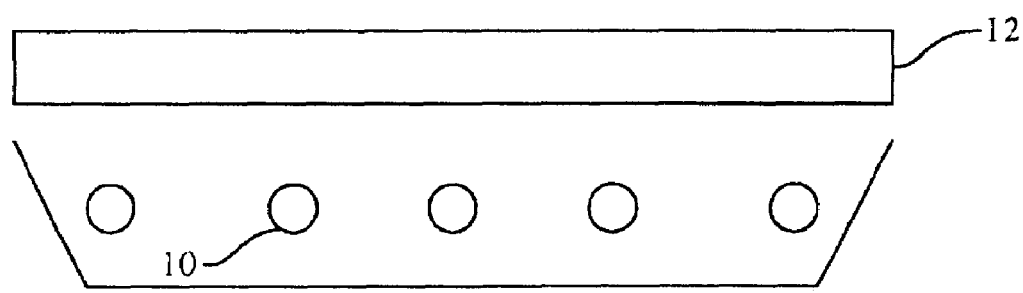
FIG. 1B is a schematic drawing of a conventional edge light type backlight module.
Figure 2:
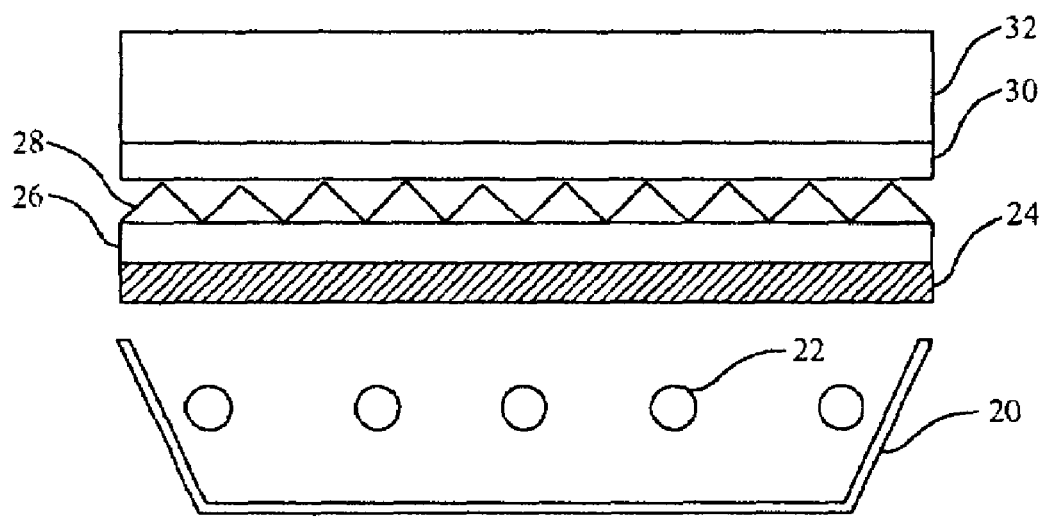
FIG. 2 is a schematic drawing of a conventional direct-type backlight module applied to a liquid crystal display.
Figure 3:
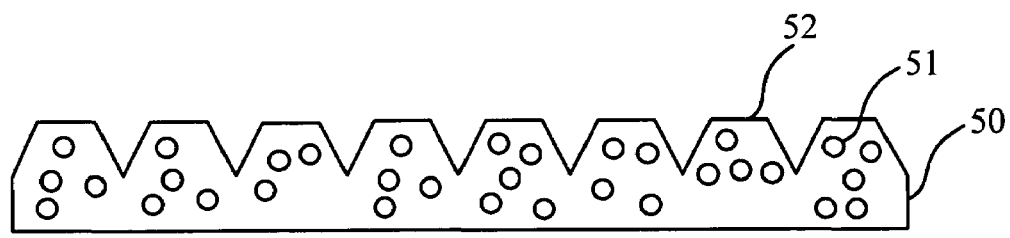
FIG. 3 is a schematic drawing of an embodiment according to the present invention.
Figure 4:
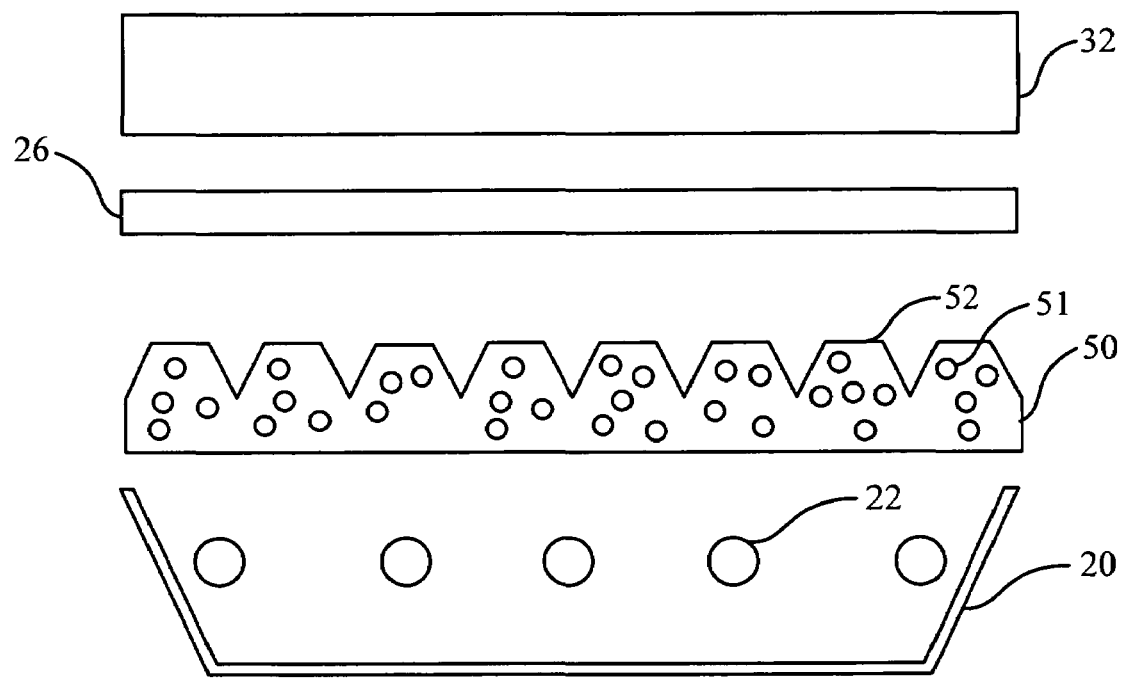
FIG. 4 is a schematic drawing showing an embodiment of the present invention applied to a liquid crystal display.

Refer to FIG. 3, the present invention is a high brightness diffusion plate with trapezoid lens that is applied to a direct type backlight module. At least one side of the high brightness diffusion plate 50 of the present invention is disposed with a plurality of trapezoid lens 52 and the diffusion plate 50 is arranged over a light source composed of a plurality of CCFL. Because two legs of the trapezoid lens 52 provide structure similar to prism sheets, the trapezoid lens 52 can focus light energy beyond 45 degrees to a center. As shown in FIG. 4, the high brightness diffusion plate 50 according to the present invention is disposed in a direct type backlight module. The backlight module, from bottom to top, sequentially includes a reflector 20, a cold cathode fluorescent lamp (CCFL) 22, a high brightness diffusion plate 50, and a lower diffuser sheet 26. The backlight module is connected with a LCD module 32. Thus the efficiency of the direct type backlight module is improved while the cost is reduced.

Figure 5A:
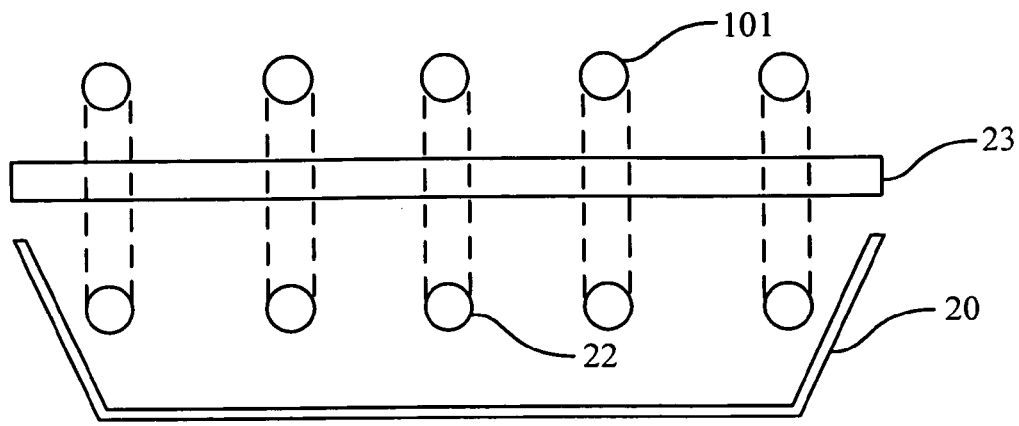
FIG. 5A is a schematic drawing showing bright bands over a transparent acrylic plate.
Figure 5B:
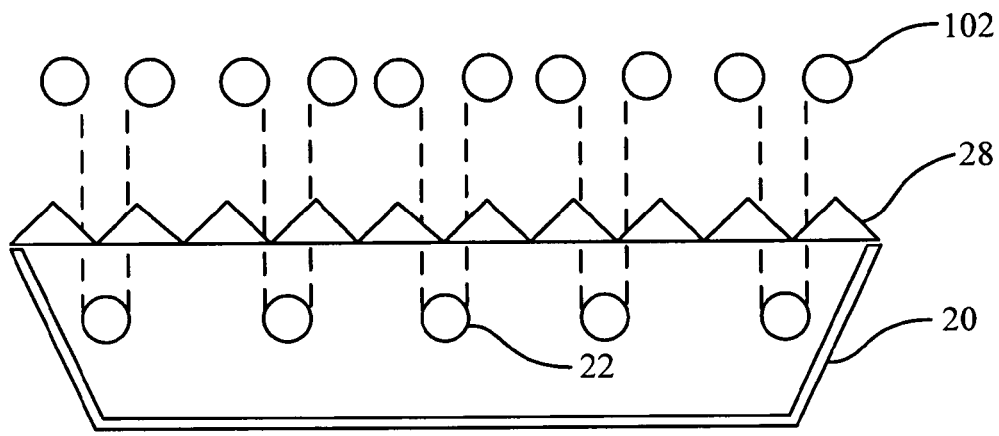
FIG. 5B is a schematic drawing showing bright zones over a transparent acrylic plate.

A controlled trial is taken for comparison with an embodiment of the present invention. Firstly, set a transparent acrylic plate 23 with thickness of 2 millimeters over the CCFL light source 22. Refer to FIG. 5A, without any other optical material or membrane, a plurality of bright bands 101 is formed over the lamp. Then a prism sheet 28 is put over the CCFL light source 22, a plurality of bright zones 102 can also be observed without the diffusion plate. But the original bright band 101 is changed into two bright zones 102 by refraction of the prism sheet 28 and the bright zones 102 respectively are located on two sides of a central line of the lamp, as shown in FIG. 5B.

Figure 5C:
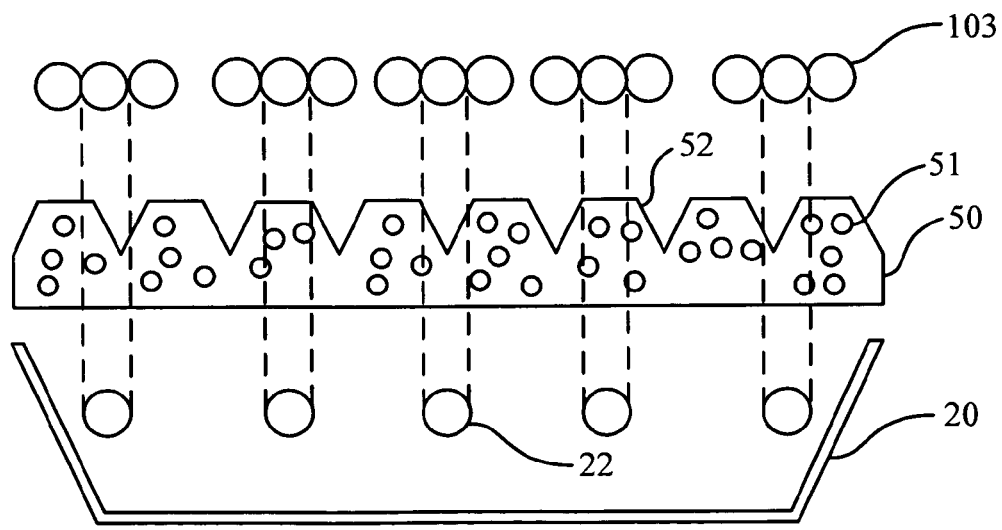
FIG. 5C is a schematic drawing showing bright zones over an embodiment according to the present invention.

In order to improve the condition that the bright band is divided into two zones through refraction of the prism sheet, top part of the triangle of the prism sheet is cut so as to form a trapezoid, as shown in FIG. 3. By change of length of the upper base and that of the height, ratio of light emitted from the front side is adjusted for providing more uniform diffusion. The two legs of the trapezoid can also provide light-converging function. Refer to FIG. 5C, the diffusion plate 50 with trapezoid lens 52 is set over the CCFL light source 22, the original bright band in FIG. 5A is replaced by three bright zones 103 through refraction of the trapezoid lens 52. Therefore, not only the number of the bright zones 103 is increased but also the distribution of the bright zones 103 is more uniform.

The present invention provides trapezoid lens as light exit surface of the diffusion plate. As shown in FIG. 3, energy beyond 45 degrees is converged and bright bands of the lamp are distributed more uniform. This is resulted from modification of the surface structure. Moreover, another way of enhancement is through adding certain amount of diffusion particles inside the diffusion plate. By addition of diffusion particles, the transparence is increased from traditional rate 55%~65% to 75~85%. At the same time, the brightness is also improved. Therefore, the high-brightness diffusion plate with trapezoid lens according to the present invention not only improves the brightness but also provides more uniform light.

According to test results, the high-brightness diffusion plate with trapezoid lens according to the present invention in combination with at least one piece of diffusion film achieves the same effect of the prism sheet. Thus the cost is reduced by replacing the prism sheet with the high-brightness diffusion plate with trapezoid lens of the present invention.

The high-brightness diffusion plate with trapezoid lens according to the present invention is made from plastic material such as polycarbonate (PC), poly(methyl methacrylate) (PMMA), poly(methyl methacrylate) styrene copolymer (MS) or polystyrene while material for diffusion particles is selected from followings: poly(methyl methacrylate) (PMMA), silica, silicon, polystyrene (PS), melamine, calcium carbonate, Teflon (polytetrafluoroethylene) or combinations of above material.

The high-brightness diffusion plate 50 is made from plastic material pressed into a plate through an extrusion process. At the same time, a plurality of trapezoid lens is produced by a trapezoid mold on a roller of an extruder. Thus a diffusion plate with trapezoid lens is extruded directly while the diffusion plate and the plurality of trapezoid lens are integrated with each other.

Figure 6:
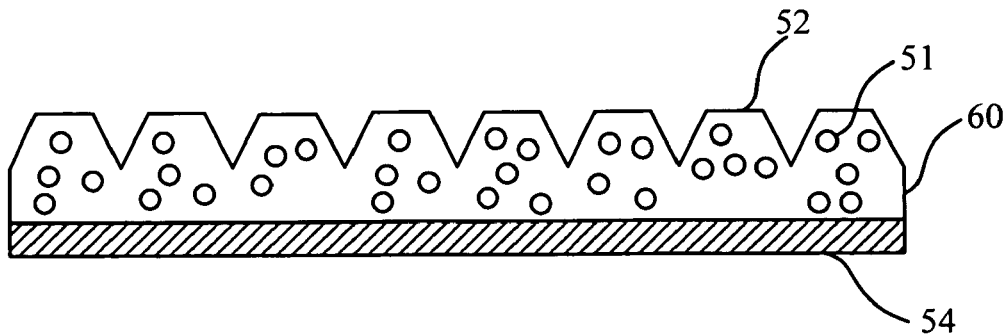
FIG. 6 is a schematic drawing of an embodiment according to the present invention.

Refer to FIG. 6, a manufacturing method for high-brightness diffusion plate according to the present invention is by a co-extrusion process. Through the co-extrusion process 2 m/min in line speed, the plastic is extruded into a diffusion plate 60 with a width of 1500 millimeters and a thickness of 1.5 millimeters. Simultaneously, an UV absorbing layer 54 with thickness ranging from 50 micrometers to 200 micrometers is coated on light entrance surface of the high-brightness diffusion plate 60. Also a plurality of trapezoid lens is formed by a trapezoid mold on a roller of an extruder. Thus a high brightness diffusion plate 60 with trapezoid surface structure is extruded directly. As shown in FIG. 6, a length of the upper base of the trapezoid structure is 100 micrometers, the lower base is 300 micrometers and the height is 100 micrometers. In this embodiment, poly (methyl methacrylate) styrene copolymer of the Japanese Co. Denki Kagaku Kogyo is used as substrate for the diffusion plate with 1% 10% diffusion particles 51 made from PMMA. The high-brightness diffusion plate 60 in FIG. 6 in combination with two bottom diffusion films disposed in a direct-type backlight module for a 32" liquid crystal display television enables the backlight module to have high brightness, lamp shielding and diffusion effect without disposition of prism sheet. Therefore, the cost is down.

Figure 7:
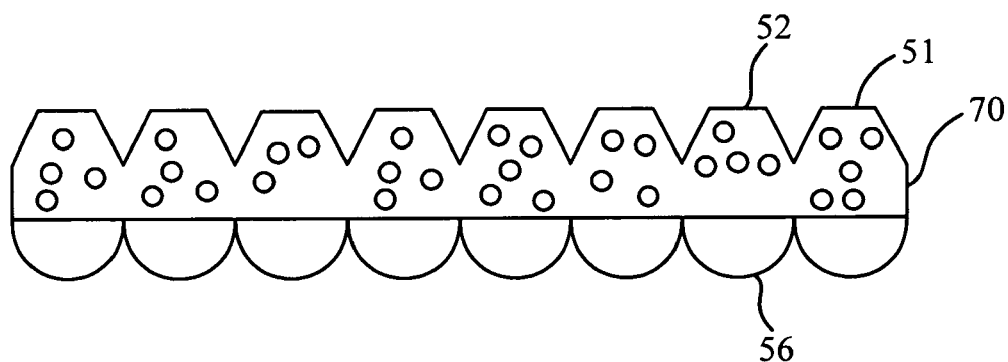
FIG. 7 is a schematic drawing of another embodiment according to the present invention.

Refer to FIG. 7, the light exit surface of the high-brightness diffusion plate 70 of this embodiment is in trapezoid structure. On the other side of the high-brightness diffusion plate 70-light entrance surface, a plurality of microstructure such as lenticular lens 56 is arranged thereof. The high-brightness diffusion plate 70 is made from the material mentioned above while the amount of the diffusion particles 51 is reduced by 1% to 5%.

The difference between the embodiment in FIG. 6 and the embodiment in FIG. 7 is in that the diffusion plate 60 in FIG. 6 has only one side thereof disposed with a plurality of trapezoid lens 52 while both two sides of the high-brightness diffusion plate 70 in FIG. 7 have lens-a plurality of trapezoid lens 52 and a plurality of lenticular lens 56. The function of the lenticular lens is to make light more uniform and increase viewing angle of exit light. Because both sides of the high-brightness diffusion plate 70 are arranged with microstructures that scatter light, the amount of the diffusion particles 51 added is further reduced. Furthermore, the transparence of the high-brightness diffusion plate 70 is over 85%. The brightness is improved further. The diffusion plate 70 with double-side lens is combined with a bottom diffusion film and then disposed in a direct-type backlight module of a 32 inch LCD television. Without a prism sheet as well as a diffusion film, this direct-type backlight module still has higher brightness, lamp shielding ability, and similar diffusion effect. Therefore, the cost is dramatically reduced.

Figure 8:
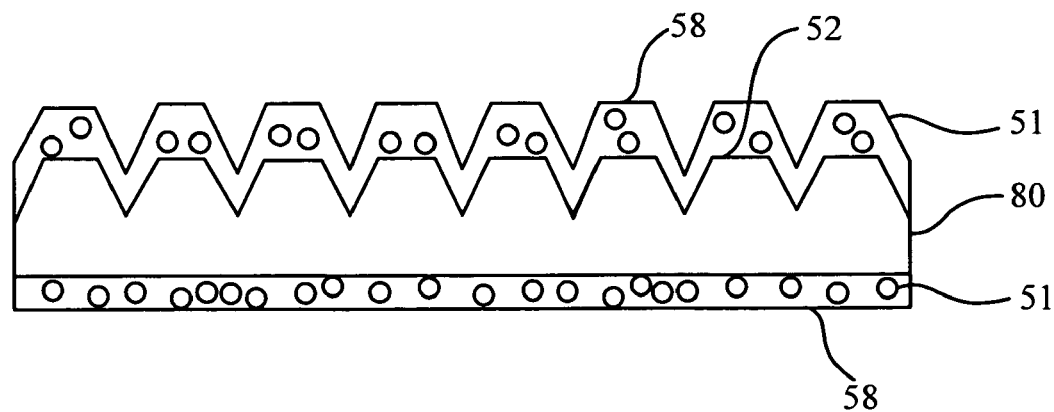
FIG. 8 is a schematic drawing of a further embodiment according to the present invention.

Refer to FIG. 8, the difference between this embodiment and the embodiment in FIG. 3 is in that the main body of the high-brightness diffusion plate 50 in FIG. 3 is added with diffusion particles 51 while the main body of the high-brightness diffusion plate 80 in FIG. 8 is not added with any diffusion particles 51. By the co-extrusion process, the diffusion layer 58 is covered on surface of the high-brightness diffusion plate 80, on top and bottom surfaces of the trapezoid structure. The thickness of the diffusion layer 58 ranges from 50 micrometers to 200 micrometer. Moreover, the diffusion layer 58 can be added with high concentration of diffusion particles 51 so as to achieve better shielding effect and more uniform light. The amount of diffusion particles 51 added is reduced so that the cost is down.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A diffusion plate with trapezoid lens applied to a direct-type backlight module comprising:

a diffusion plate disposed over a plurality of light sources of the direct-type backlight module and a plurality of trapezoid lenses are arranged on at least one side of the diffusion plate, the diffusion plate being made from plastic by an extrusion process so that the diffusion plate is integrated with the trapezoid lenses, the extrusion process is a co-extrusion process that produces the diffusion plate by plastic being pressed through an extruder and the diffusion plate having the trapezoid lenses on at least one side and a UV absorbing layer.

2. The device as claimed in claim 1, wherein the thickness of the diffusion plate ranges from 0.5 millimeters to 5 millimeters.

3. The device as claimed in claim 1, wherein each of the trapezoid lens comprises an upper base and a lower base while the length of the upper base ranges from 20 micrometers to 500 micrometers and the length of the lower base ranges from 100 micrometers to 800 micrometers.

4. The device as claimed in claim 3, wherein the height of each trapezoid lens ranges from 20 micrometers to 500 micrometers.

5. The device as claimed in claim 1, wherein the plastic is selected from polycarbonate (PC), poly (methyl methacrylate) (PMMA), poly (methyl methacrylate) styrene copolymer (MS), polystyrene or combinations of them.

6. The device as claimed in claim 1, wherein the UV absorbing layer is formed on surface of the diffusion plate for absorbing ultraviolet light from the light sources.

7. The device as claimed in claim 1, wherein the thickness of the UV absorbing layer ranges from 50 micrometers to 500 micrometers.

8. The device as claimed in claim 1, wherein the extrusion process is using plastic pressed through an extruder to form the diffusion plate with a plurality of trapezoid lens on at least one side thereof.

9. The device as claimed in claim 1, wherein the diffusion plate has a plurality of trapezoid lens on one side thereof and a plurality of lenticular lens on the other side thereof.

10. The device as claimed in claim 1, wherein the diffusion plate has a plurality of trapezoid lens on one side thereof and a plurality of prism sheets on the other side thereof.

11. The device as claimed in claim 1, wherein the extrusion process combines with a co-extrusion process so that the diffusion plate having a plurality of trapezoid lens on one side thereof and a surface diffusion layer thereof.

12. The device as claimed in claim 11, wherein the surface diffusion layer is formed on at least one side of the diffusion plate.

13. The device as claimed in claim 11, wherein the thickness of the surface diffusion layer ranges from 50 micrometers to 500 micrometers.

14. The device as claimed in claim 1, wherein the diffusion plate further comprises a plurality of diffusion particles that ranges from 1 to 10 weight percent.

15. The device as claimed in claim 14, wherein the diffusion particles are made from poly(methyl methacrylate) (PMMA), silica, silicon, polystyrene (PS), melamine, calcium carbonate, Teflon (polytetrafluoroethylene) or combinations of them.

16. A diffusion plate with trapezoid lens applied to a direct-type backlight module comprising:

a diffusion plate disposed over a plurality of light sources of the direct-type backlight module and a plurality of trapezoid lenses are arranged on at least one side of the diffusion plate, the diffusion plate being made from plastic by an extrusion process so that the diffusion plate is integrated with the trapezoid lenses, the extrusion process using plastic pressed through an extruder to form the diffusion plate with the plurality of trapezoid lenses on at least one side thereof.

* * * * *